(No Model.) 2 Sheets—Sheet 1.
J. A. WHITNEY.
PLUMBER'S TRAP.
No. 326,612. Patented Sept. 22, 1885.
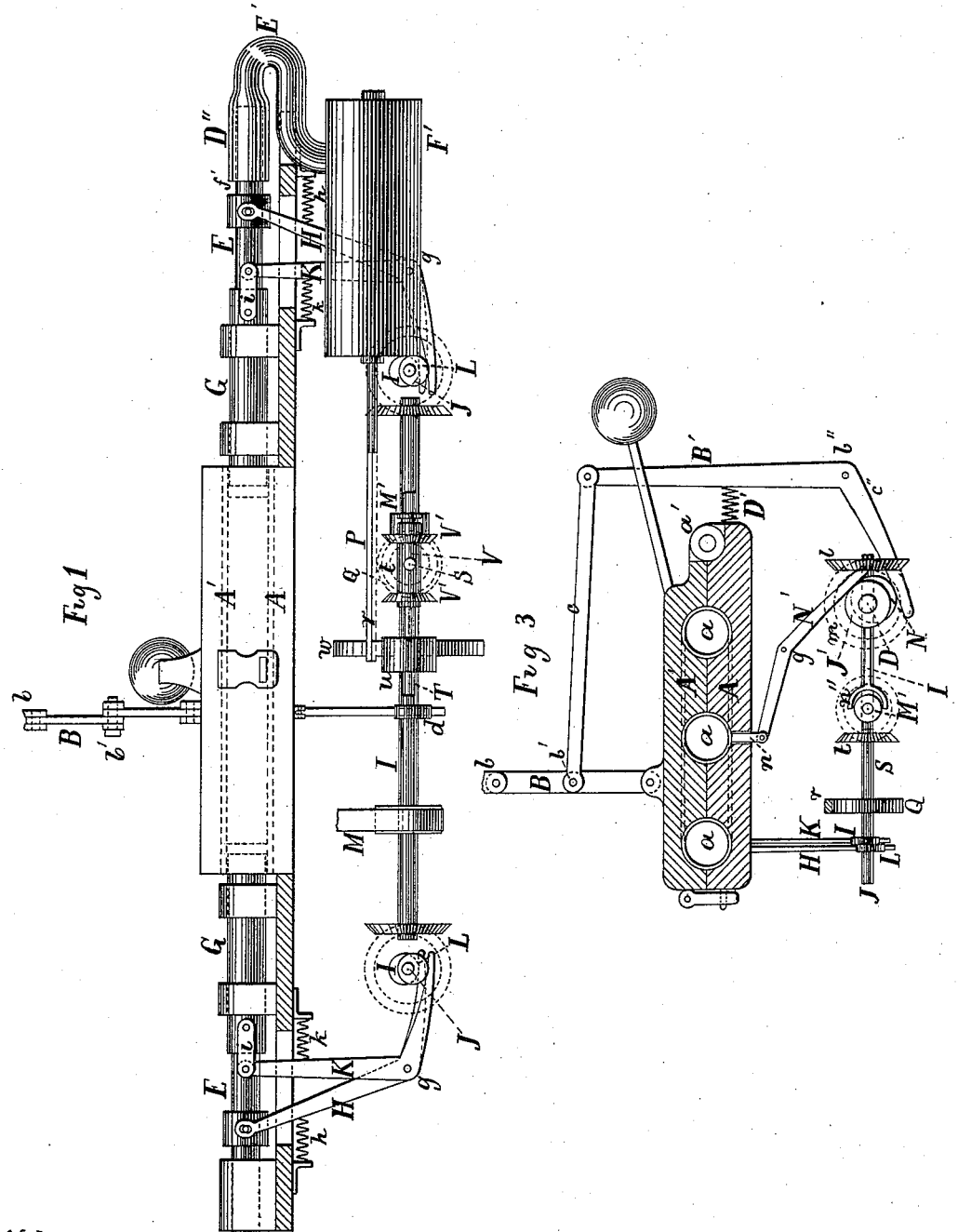
Witnesses
Rudolf H. Pillman
Edward A. Holley
Inventor
James A. Whitney (No Model.) 2 Sheets—Sheet 2.
J. A. WHITNEY.
PLUMBER'S TRAP.
No. 326,612. Patented Sept. 22, 1885.
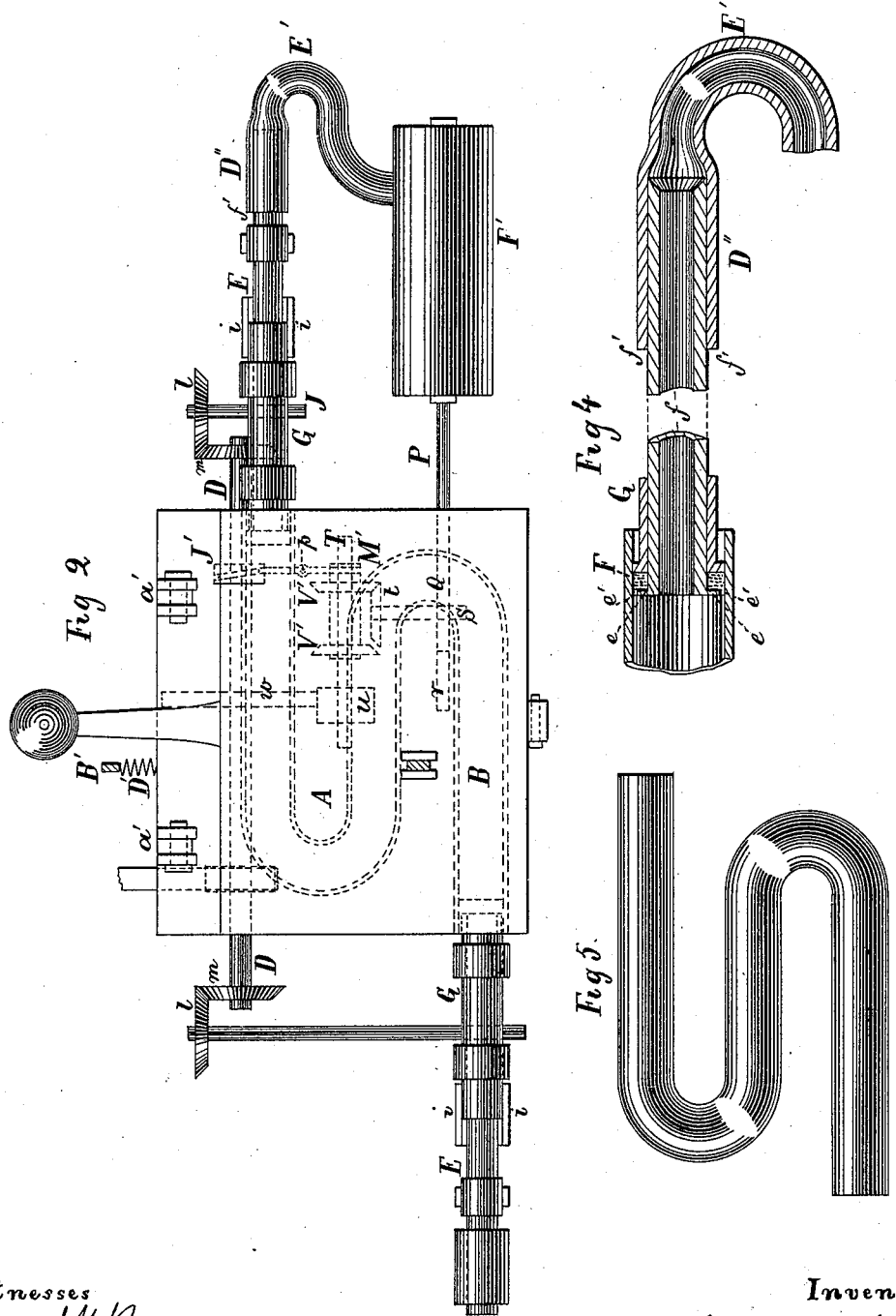

UNITED STATES PATENT OFFICE.

JAMES A. WHITNEY, OF DOBBS FERRY, NEW YORK.

PLUMBER'S TRAP.

SPECIFICATION forming part of Letters Patent No. 326,612, dated September 22, 1885.

Application filed March 5, 1883. Renewed February 11, 1885. (No model.)

*To all whom it may concern:*

Be it known that I, JAMES A. WHITNEY, of Dobbs Ferry, otherwise known as Greenburg, in the county of Westchester, and State of New York, have invented an Improvement in Plumbers' Traps, of which the following is a specification.

This invention relates to the manufacture of plumbers' traps of soft metal of a different character, texture, and density from those hitherto in use.

My invention consists of a plumber's trap composed of soft metal—such as lead—which is compressed after the desired form has been given to the trap by casting, whereby a trap possessing peculiarities readily distinguishing it from the common cast trap and from the drawn trap is produced.

Figure 1 is a front view of an apparatus included in my said invention. Fig. 2 is a plan view of the same. Fig. 3 is a vertical transverse sectional view of the same. Fig. 4 is a detail view on a larger scale of certain parts included in the said machine, and Fig. 5 is a view of the trap itself.

A A' are the two halves of a die, the cavity $a\ a$ of which corresponds in shape to that of the traps to be operated upon, the trap itself being primarily cast of lead or equivalent soft metal in the usual manner, and of any of the shapes usual with plumbers' traps of soft metal. The cavity of the said die is of course formed one half in each of the parts A A'. The part A is fixed or stationary. The part A' is hinged at its rearmost edge, as shown at $a'$.

Pivoted to the upper or outer side of the part A' is the lower end of a toggle-joint, B, the upper end of which is pivoted to a fixed support, $b$. The joint $b'$ of the toggle-joint aforesaid is actuated by a rod, $c$, with an elbow-lever, B', the pivot of which is shown at $b''$, and the lower arm, $c''$, of which passes underneath and in contact with a cam, $d$, on a shaft, D, hereinafter further referred to.

A spring, D', is attached to the lever B' in such manner as to throw the upper arm of said lever outward to bend the toggle-joint B in opposition to the action of the cam $d$, which is arranged to throw the said arm of the said lever inward to straighten the said toggle-joint, the bending of the toggle-joint tending to lift the upper part, A', of the die, while the straightening of the said toggle-joint not only forces downward the said part A' of the die upon the lower part thereof to close the cavity $a\ a$, but also firmly holds the said part A' down upon the part A against any internal pressure which might otherwise tend to lift the said upper part of the die. The ends of the cavity $a\ a$ are open, so that when a trap is placed in the said cavity the ends thereof will be coincident with the said ends of the cavity and will themselves be open.

E E are rods or cylindrical bars, which are coincident with the two ends of the cavity $a\ a$, and are capable of a longitudinal movement, so as to move inward to and outward from the said cavity. Upon the inner end of each of these bars E is a circumferential flange, $e$, which should be of a diameter and slightly less than that of the interior of the end of the trap when the latter is placed in the cavity $a\ a$, as aforesaid.

Placed upon each bar E, at the outer side of the flange $e$ thereof, is a ring or band, F, of india-rubber or equivalent yielding or elastic material. This is preferably formed with a small lip, $e'$, which projects over the adjacent circumferential edge of the flange $e$.

Placed upon each of the bars E is a sleeve, G, the inner end of which bears against the outer side of the ring F, so that when the bars E are thrust inward, as hereinafter explained, to bring the rings F within the ends of the trap, and the sleeves G are moved inward against the rings F, the said rings F, while pressed in the direction of the length of the bars E and sleeves G, will be expanded radially with a force sufficient to effectually close the ends of the traps against the passage of water or other suitable fluid under pressure within the trap, as hereinafter explained. One of the bars E is hollow—that is to say, is provided with a tubular passage, $f$—and has its outer end capable of longitudinal movement within a sleeve or cylindrical casing, D'', which connects by a pipe, E', with the barrel F' of a pump, the said barrel F' being surrounded by a steam-jacket or equivalent heating device, for the purpose hereinafter set forth.

By means of the pump water or other suitable liquid can be forced through the pipe E', sleeve D'', and the tubular passage of the last-mentioned bar E into the interior of the trap, as the latter is confined within the cavity $a\ a$ of the die, notwithstanding any longitudinal movement that may be given to the said bar E. In order to prevent the escape of the water or other fluid between the sleeve D'' and the said tubular bar E, a suitable stuffing box, $f'$, should be arranged at the outer end of the sleeve D''.

The bars E are moved inward by means of elbow-levers H, the upper ends of which are connected with the said bars E, while the lower ends of said elbow-levers are placed in suitable relation with cams I on shafts J, the fulcra of said elbow-levers H, and also of other levers, K, just hereinafter referred to, being indicated at $g$. Springs $h$ are arranged to draw backward or outward the upper arms of the elbow-levers H in opposition to the action of the cams I. The sleeves G receive their longitudinal movement by the elbow-levers K, the upper arms of which, by means of links $i$ or otherwise, are connected with the said sleeves, the lower arms of said levers K being arranged in due relation with cams L on the shaft J, which operate the levers K to move inward the sleeves G. A reverse movement of the levers K is given by springs $k$. The shafts J are provided at their rearmost ends with bevel-pinions $l$, which gear into bevel-pinions $m$ on the ends of the shaft D. The shaft D receives a rotary motion by a belt and pulley, M, or any other suitable means. Upon said shaft D is a cam, N, which actuates a lever, N', the pivot or fulcrum of which is shown at $g'$, and the forward end of which is connected with an inverted plunger, $n$, which passes up through a suitable opening in the part A. The upper end of this plunger is so arranged as to be flush with the bottom of the lower half of the cavity $a\ a$, except when the upper part, A', of the die is lifted and swung back, whereupon the plunger $n$, actuated by the cam N, rises and lifts the compressed trap, as hereinafter explained, so that it may be readily removed from the apparatus.

P is the piston-rod of a pump, the cylinder of which is shown at F', the outer end of said piston-rod being provided with a rack, $r$. Into this rack $r$ gears a pinion, Q, the shaft S of which is in a position at right angles to that of the shaft D, and which has at its rearmost end a bevel-pinion, $t$. Placed in front of and parallel with the shaft D is a short countershaft, T, upon which is placed a long spur-pinion, $u$, which gears into a spur-pinion, $w$, on the shaft D. Keyed upon the said countershaft T in such manner as to rotate therewith and yet be capable of longitudinal movement thereon, is a sleeve, V, upon each end of which is a bevel-pinion, V'. The bevel-pinion $t$ of the shaft S is placed between these pinions V' in such manner as to gear with one or the other of them, according as the sleeve V is moved in one direction or the other for that purpose. The boss M' of one of the bevel-pinions V' is circumferentially grooved to receive a collar, $n''$, which is connected to the adjacent end of a lever, I', the vertical pivot of which is shown at $p$. The rearmost end of this lever I' is provided with a pin which fits into a cam-groove in the circumference of a disk, J', on the shaft D. This cam-groove actuates the lever I' at suitable intervals to move the sleeve V to bring one of the bevel-pinions V' into gear with the bevel-pinion $t$, to turn the spur-wheel Q in such direction as to move inward the piston-rod P, and consequently operate the pump-piston within the barrel F' to force the water or liquid therefrom into the interior of the trap $a\ a$, as hereinbefore indicated, whereupon the cam-groove in the disk J' operates the said lever to slide the sleeve V to bring the other of the bevel-pinions V' in gear with the bevel-pinion $t$, thereby reversing the movement of said bevel-pinion and consequently that of the piston-rod of the pump, thereby causing the pump to withdraw the water or liquid from the trap in the cavity $a\ a$.

The parts are so proportioned and arranged that the trap, being placed within the cavity $a\ a$, and the toggle-joint B being straightened to close the said cavity and hold the part A' of the die firmly down upon the part A thereof, the bars E are moved inward and their inner ends are brought within the ends of the trap, whereupon the sleeves G are moved inward to radially expand the rings F, thereby tightly closing the ends of the trap, the walls of the said ends of the trap being snugly confined between the adjacent end surfaces of the cavity $a\ a$ and the radially-expanded rings F. The action of the pump, as hereinbefore explained, then forces water or other suitable liquid contained within the barrel F' of the said pump into the interior of the trap under any desired pressure, but which is designed to be sufficient to compress the comparatively porous cast metal of the trap into a solid and practically non-porous state, thereby closing all the interstices through which in the ordinary cast trap gases and the like are permitted to escape. The operation of compressing the walls of the trap into the solid and firm condition just mentioned being completed by the forcing into the same of the water or liquid under pressure, as just described, the return or outward movement of the piston P withdraws the water or liquid from the trap, which done, the reverse movement of the sleeves G permits the radial contraction of the rings F, whereupon the withdrawal of the bars E removes the rings F out of and away from the ends of the trap. This done, the backward bending of the toggle-joint B lifts upward the upper part, A', of the die, substantially simultaneous with which occurs the upward movement of the inverted plunger $n$, which lifts or loosens the trap from the lower part of the cavity, so that it may be readily removed therefrom by the hand of an attendant. This done, another trap is placed in the cavity $a\ a$, and the operation is repeated.

In case difficulty should be apprehended from the pressure of air within the trap, as opposing the action of the fluid under pressure therein, the movement of the two bars E may be so timed that the movement of the tubular one of said bars—that is to say, the one connected with the pump—may be somewhat in advance of the other, so that the closure of the opposite end of the trap may be performed at a moment when the air has been practically expelled.

In order that no excess of pressure need be incurred in the operation of the machine, the pump-barrel may be provided with a safety-valve which will yield and permit the escape of the fluid when the pressure exerted exceeds the limit desired.

The water or other liquid—such, for example, as a solution of common salt or of other salts—is heated by the steam-jacket around the pump-cylinder F', and in this heated condition acts much more readily and effectually to compress the soft metal than if the fluid were at ordinary temperatures, inasmuch as the action of the heat, even at the temperature of boiling water, softens the metal and renders it more plastic, and consequently enables the pressure to more effectually close the pores and minute orifices of the cast metal, thereby giving a very great density and solidity to the walls of the trap. When desired, other means of heating the pump-barrel F may be adopted—as, for example, by a series of gas-jets or a small furnace underneath; but in such cases care will be required that the heat does not become excessive.

The cast-lead trap when thus compressed is converted into a material having substantially different properties, inasmuch as it has lost its porous character, its deleterious property of transmitting gases through its walls, its liability to rapid corrosion from the action of acids, &c., and its liability to comparatively rapid oxidation from the facility with which air passes through its substance, and also its comparative difficulty of soldering due to its loose and porous texture. In place of these hurtful qualities, which detract materially from the value of the trap for actual use, it receives by compression a density, solidity, and strength which before were lacking, and which prevent the permeation of its substance by air, the transmission through its walls of noxious gases, and which render it stronger and more durable, and also much more readily and easily soldered than before. On the other hand, the trap thus made of compressed cast-lead differs from "drawn lead," so termed, inasmuch as it has no fibrous character, and is homogeneous, not only as concerns its texture, but also as concerns its tensile strength in various directions.

My said improved trap is in external appearance readily distinguishable from the common cast trap, inasmuch as its surface takes its peculiarities from the internal surface of the chamber or cavity in which it is compressed; whereas the common cast trap has the surface peculiar to soft metal in a simply cast condition. It also differs in external appearance from the drawn trap inasmuch as it is devoid of the strained appearance characteristic of the drawn trap.

My improved plumber's trap may be made by any suitable means or apparatus, preferably by the methods and apparatus herein shown and described; but for the purposes of this present application I do not claim said methods and apparatus, for the reason that said methods and apparatus form the subject-matter of a separate and distinct application, which I have made for Letters Patent thereon, and which said separate application is now pending in the United States Patent Office.

What I claim as my invention is—

A plumber's trap composed of cast compressed soft metal, substantially as herein set forth.

JAMES A. WHITNEY.

Witnesses:
 EDWARD A. HOLLEY,
 RUDOLF H. RJELLMAN.